No. 736,591. PATENTED AUG. 18, 1903.
G. D. FOSTER.
CORN HARVESTER.
APPLICATION FILED DEC. 17, 1901.
NO MODEL. 5 SHEETS—SHEET 2.
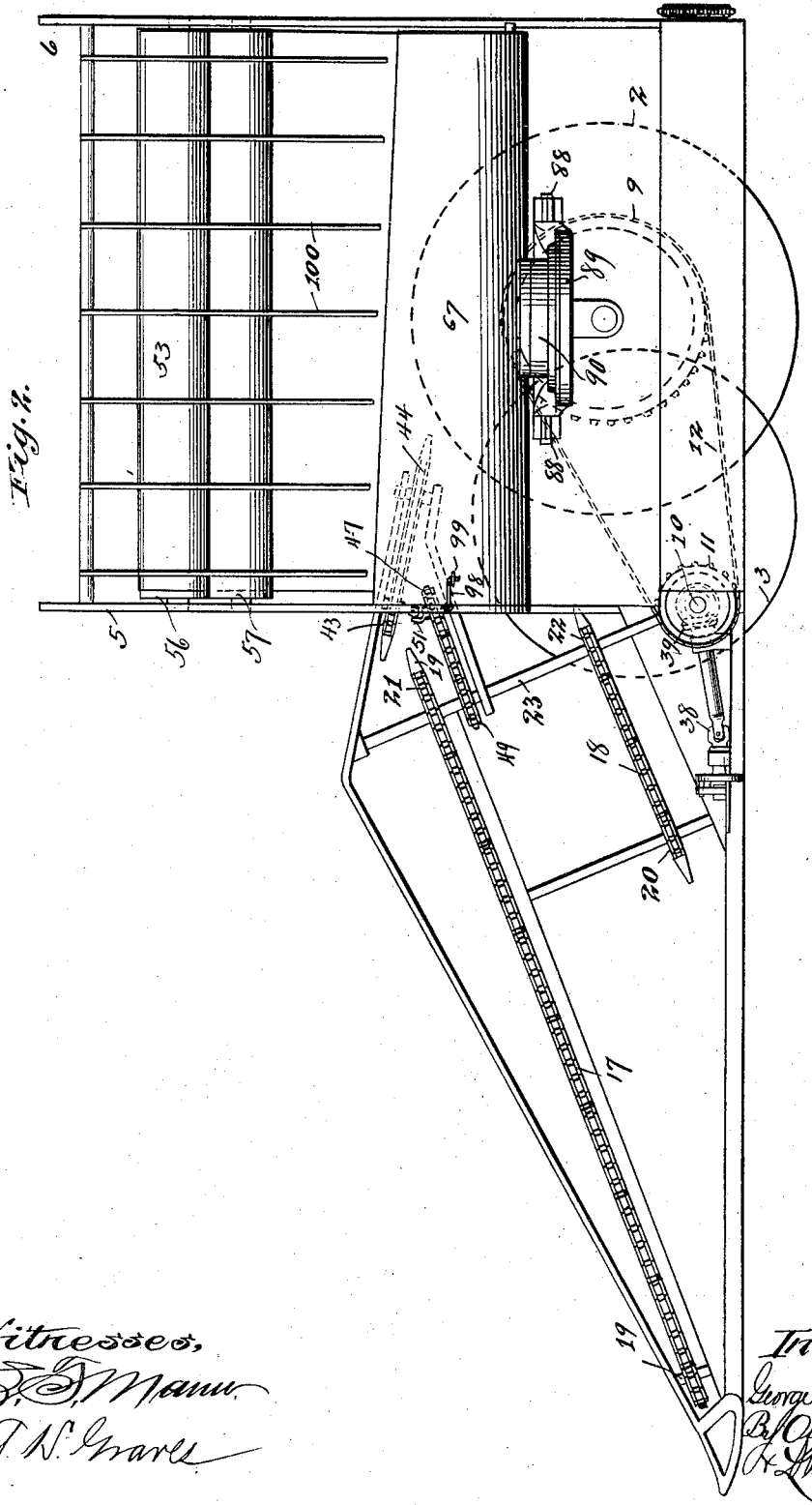

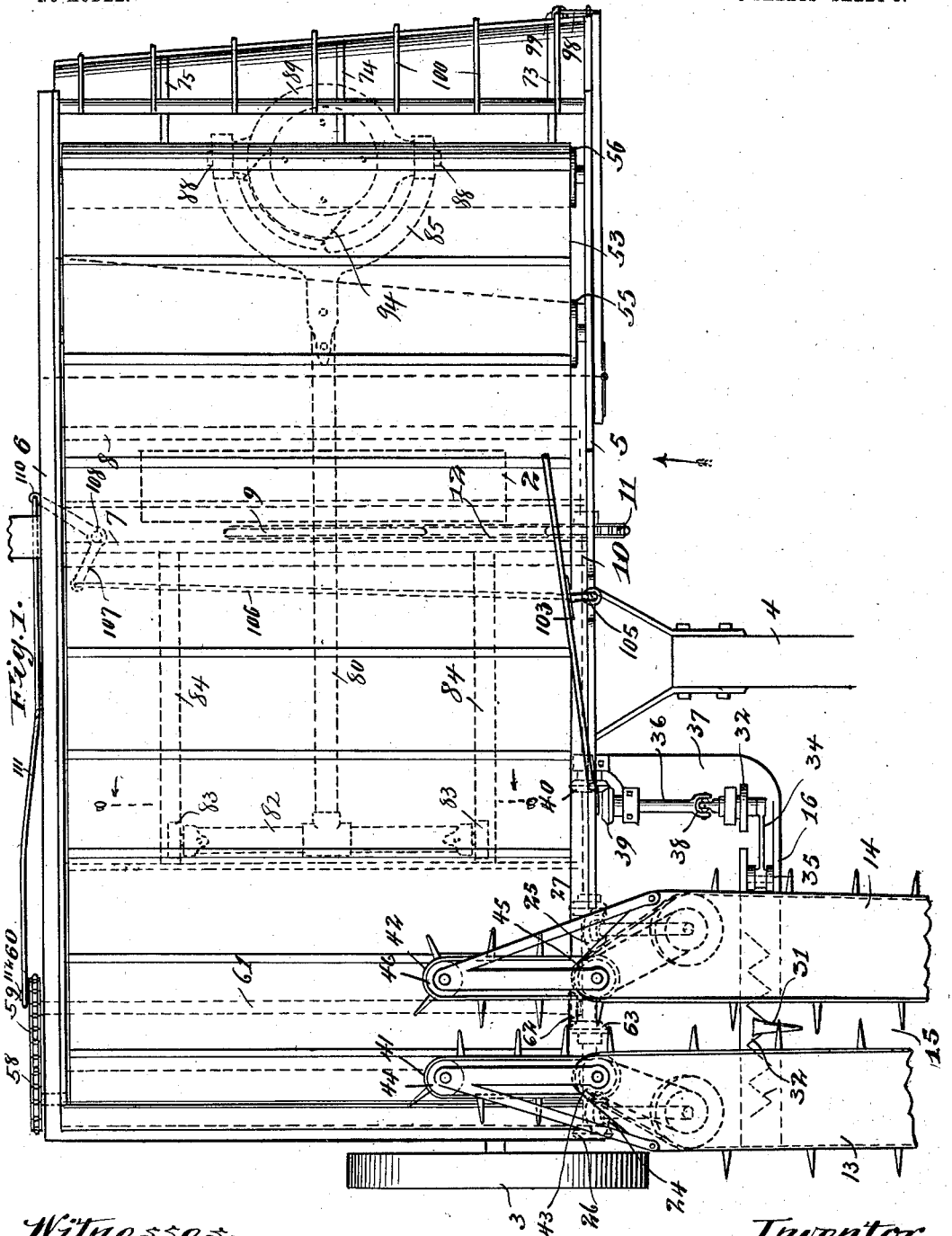

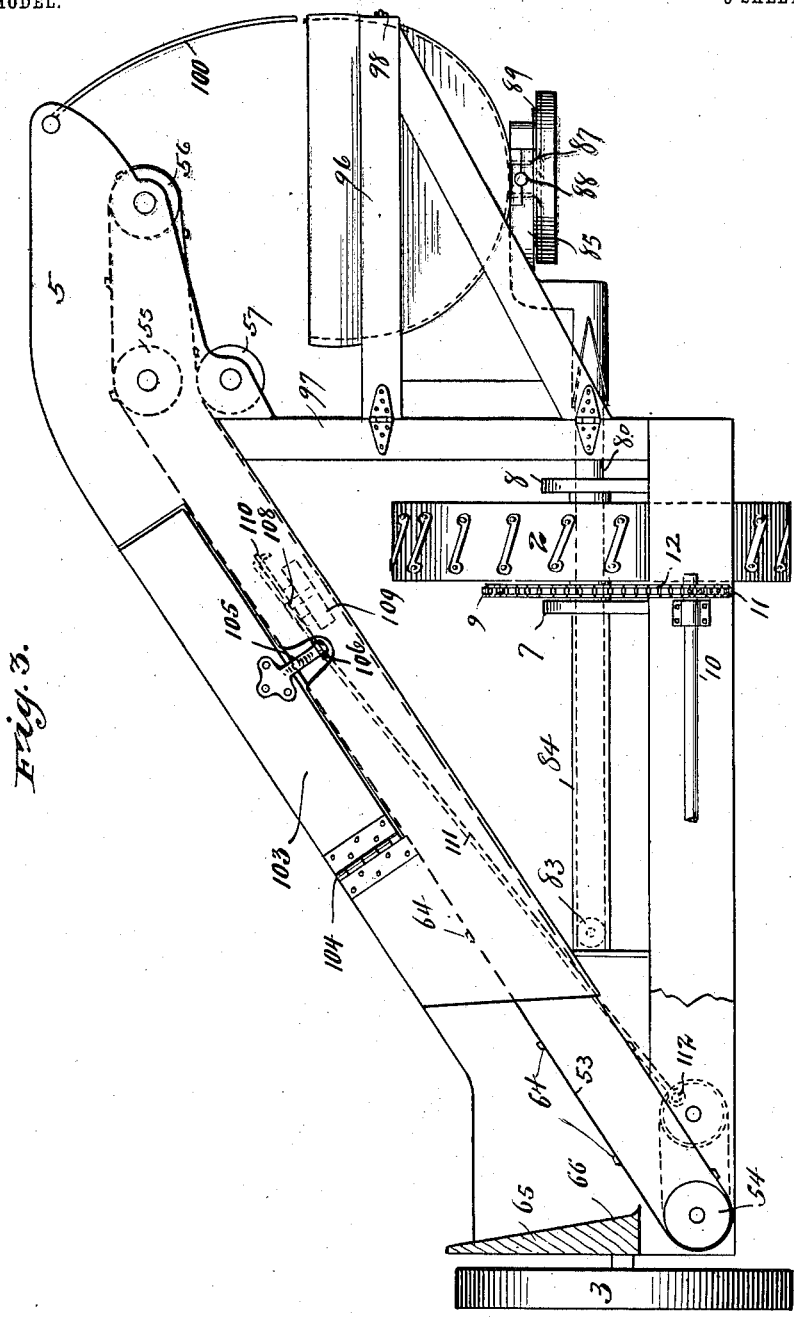

No. 736,591. PATENTED AUG. 18, 1903.
G. D. FOSTER.
CORN HARVESTER.
APPLICATION FILED DEC. 17, 1901.
NO MODEL. 5 SHEETS—SHEET 4.
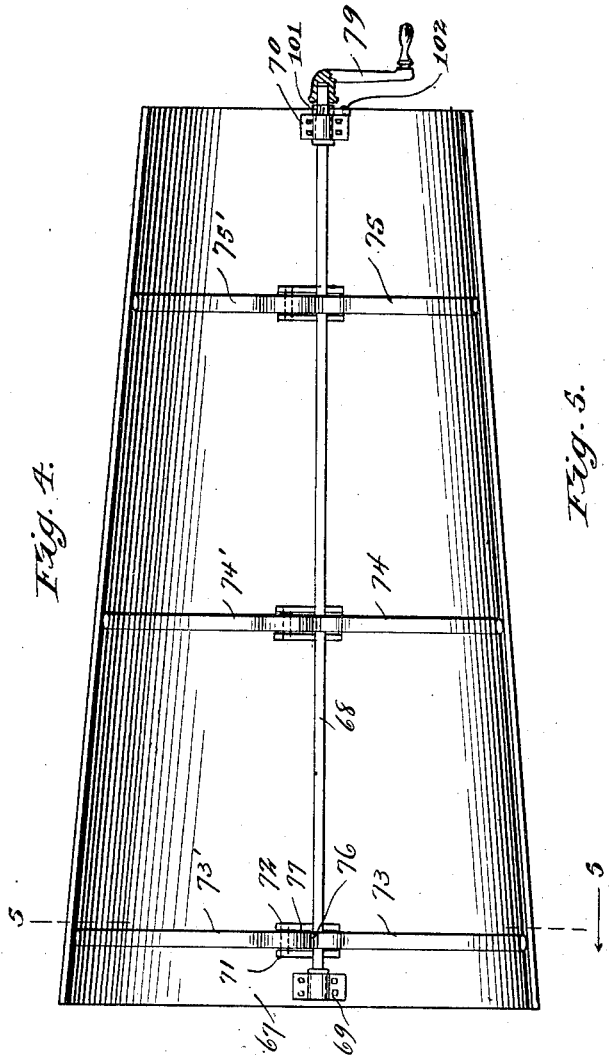
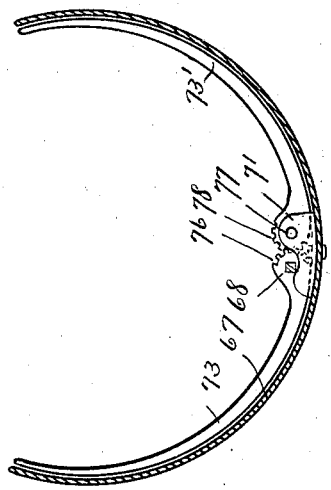
Witnesses, Inventor;

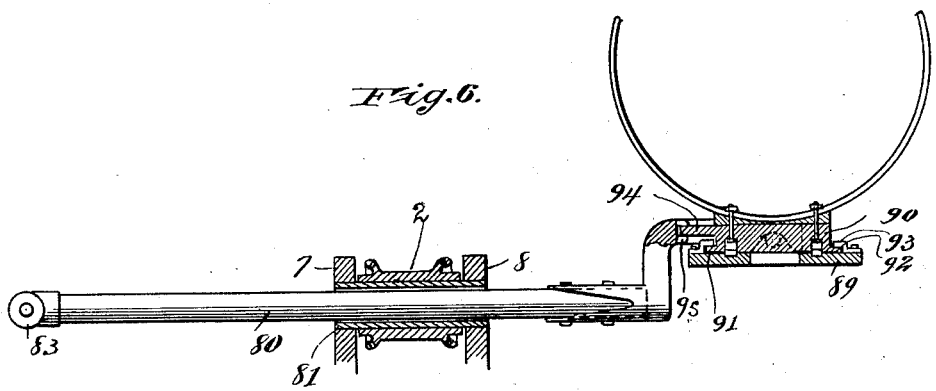
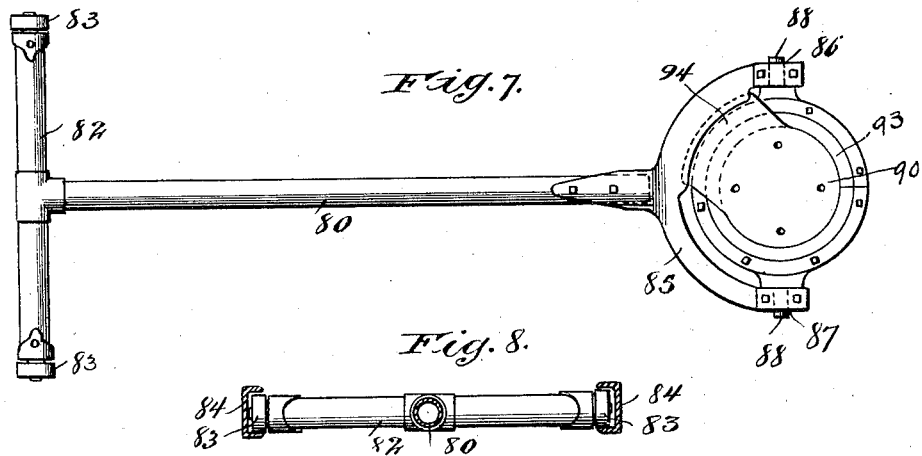

No. 736,591. Patented August 18, 1903.

UNITED STATES PATENT OFFICE.

GEORGE D. FOSTER, OF PRESTON, IOWA.

CORN-HARVESTER.

SPECIFICATION forming part of Letters Patent No. 736,591, dated August 18, 1903.

Application filed December 17, 1901. Serial No. 86,226. (No model.)

*To all whom it may concern:*

Be it known that I, GEORGE D. FOSTER, of Preston, Jackson county, State of Iowa, have invented certain new and useful Improvements in Corn-Harvesters, of which the following is a specification.

This invention relates to improvements in corn-harvesters, and refers more specifically to harvesters of that general type which operate to cut the standing corn, form it into shocks or bundles, and discharge it.

Among the salient objects of the invention are to provide an improved shock-forming mechanism whereby the corn may be formed into full-sized complete bound shocks and delivered from the harvester in standing position with a minimum of amount of manual labor and expeditiously; to provide in a harvester a shocking mechanism so constructed and operating in such manner as to readily deliver the shocks at a point clear of the path of the harvester upon a succeeding round, so that notwithstanding the shocks are left erect they will not be interfered with thereafter by the harvester; to provide a construction in which the shock or bundle after having been collected and formed may be carried bodily laterally and at the same time carried into erect position with a minimum expenditure of manual power, although this transferring operation is accomplished by manually-operated mechanism while the machine is standing; to provide an extremely simple and effective cutting and gathering mechanism whereby the corn is cut and transferred to the shock-forming cradle; to provide an improved cradle or receptacle for receiving the corn from the traveling apron or carrier and whereby the accumulated stalks may be readily compressed into shock form preparatory to tying and delivering the same; to provide improvements in the details of mounting the cradle whereby the latter is adapted to be shifted bodily and in general to provide a simple and improved construction of the character referred to.

To these ends the invention consists in the matters hereinafter described, and more particularly pointed out in the appended claims, and will be readily understood from the following description, reference being had to the accompanying drawings, wherein—

Figure 1 is a plan view of the principal parts of a corn-harvester constituting a preferred embodiment of my invention, the tongue and front end portions of the gathering-fingers at the front and the driver's seat at the rear being broken off to reduce the size of the figure. Fig. 2 is a view of the machine in side elevation with certain parts omitted and looking toward that side of the machine at which the corn is delivered, the gathering-fingers being shown in full length and the tongue omitted in this figure. Fig. 3 is a front elevation of the machine with the gathering-fingers, the driving mechanism therefor, and the tongue omitted, so as to expose the parts in rear thereof more clearly. Fig. 4 is a plan view of the cradle. Fig. 5 is a transverse sectional view taken on line 5 5 of Fig. 4 and looking in the direction of the arrows. Fig. 6 is a view, partly in section and partly in side elevation, of the cradle and supporting mechanism therefor, the turn-table portion of the cradle being shown in axial section and the main supporting-wheel of the harvester, through the axis of which the turn-table support extends and reciprocates, being also shown in axial section. Fig. 7 is a top plan view of the cradle-support disconnected from the cradle. Fig. 8 is a transverse sectional detail taken on line 8 8 of Fig. 1 and looking in the direction of the arrows, it being understood that the members thus shown in section are located beneath the traveling apron.

Referring to said drawings, 1 designates as a whole the main frame of the machine, which is of generally rectangular form and suitably constructed to support the several operative parts of the machine, said frame being supported at one side by means of the usual bull-wheel 2, at its opposite side by smaller supporting-wheel 3, and provided at its front side with the usual tongue 4, constituting the draft-rigging.

Between the front and rear transversely-extending main-frame members 5 and 6 extend two parallel frame members 7 and 8, between and upon which is mounted and journaled the bull-wheel 2 in a usual manner, said wheel being provided with a concentric sprocket 9, from which the driving power of the several operative parts of the machine is derived.

10 designates a main transversely-extending drive-shaft suitably mounted to extend along the front side of the machine and provided at a point opposite the sprocket 9 with a rigidly-mounted sprocket 11, which is driven from the main sprocket 9 by means of a link belt 12.

13 and 14 designate as a whole the two gathering-fingers, which serve to gather and direct the stalks to the sickle, these gathering-fingers being spaced apart, as usual, so as to provide an intervening throat or passage 15 therebetween, through which the stalks pass and are guided to the cutter-bar (designated as a whole 16) and arranged to extend transversely across the under sides of the gathering-fingers at a point near the rear ends of the latter. In order to draw the corn rearwardly between the gathering-fingers in a positive manner as the machine is drawn along, a pair of conveyer-belts 17 and 18 is mounted upon each of said gathering-fingers, which conveyer-belts are severally provided with prongs or projections 19, which project into the throat between the gathering-fingers and serve to engage and force the stalks rearwardly positively. In the preferred embodiment shown herein the upper conveyer-belts 17 are arranged to extend very near the extreme front ends of their respective gathering-fingers rearwardly and upwardly to the rear ends thereof, while the shorter lower belts 18 are arranged substantially parallel with the upper belts, but extend forwardly from the rear ends of the gathering-fingers somewhat less than one-half of the length of the latter. In order to support and drive the conveyer-belts in the manner described, guide-sprockets 19 and 20 are suitably journaled in the gathering-fingers to support the front ends of the respective belts 17 and 18 in the rear ends of each gathering-finger, while at their rear ends said belts pass around and are driven by means of sprockets 21 and 22, respectively, rigidly mounted upon a shaft 23, journaled in the finger to extend at right angles to the direction of the belts. At their lower ends each of the shafts 23 is provided with a bevel-gear, as 24 and 25, respectively, arranged to intermesh with corresponding bevel-gears 26 and 27, mounted upon the main drive-shaft 10.

In order to sever the stalks, I employ an ordinary sickle mechanism, comprising in the present instance the usual sickle-bar 16, provided with guards 31, through which reciprocate a sickle 32 in the usual manner. In order to actuate said sickle, a pitman-wheel 32 is suitably journaled upon the sickle-bar 16 at one end thereof, which pitman-wheel is provided with the usual wrist and serves to actuate the sickle-bar through a pitman-rod 34, connected with the wrist and eye 35 of the sickle in the usual manner. The pitman-wheel 32 is actuated through the medium of a drive-shaft 36, suitably journaled upon an extension frame member 37, one end of said drive-shaft being operatively connected with the journal-shaft of the pitman-wheel by means of a universal joint 38, while the opposite end of said drive-shaft is provided with a bevel-gear 39, which intermeshes with a corresponding gear 40 upon the main shaft.

In order to force the stalks of corn to fall rearwardly with their top ends to the rear of the machine, I provide extension conveyer-belts, as 41 and 42, at the rear of the respective gathering-fingers, which receive the corn from the throat of the gathering-fingers and operating to tilt it rearwardly. To this end said conveyer-belts are mounted upon sprockets 43, 44, 45, and 46, journaled in extension-frames carried by or formed with the rear ends of the respective gathering-fingers, these sprockets being so disposed that the conveyers extend substantially parallel with each other at a distance apart corresponding to the width of the throat and obliquely downwardly and rearwardly. In order to actuate said conveyers in such manner that they are driven at a slightly-greater speed than the speed of the conveyer-belts 17 and 18, driving-sprockets 47 and 48 are journaled in the extension-frames beneath the sprockets 43 and 45, respectively, and these drive-sprockets are driven from corresponding sprockets 49 and 50, mounted upon the shafts 23. Inasmuch as the said axes of rotation of the drive-sprockets 47 and 48 are necessarily at an angle to the axes of rotation of the sprockets 43 and 45, these pairs are respectively united with each other by means of universal joints, as indicated at 51, and in this connection it is to be noted that the sprockets 47 and 48 are of smaller diameter than the sprockets 49 and 50, from which they are driven, so that the speed of the conveyer-belts driven thereby is correspondingly increased.

The cornstalks delivered from the conveyer-belts 41 and 42 are received upon a driven apron or lifting-gear, (designated as a whole 53.) This conveyer in the preferred embodiment shown consists of a continuous endless apron, which extends from the right hand of the main frame obliquely upwardly to a point above and outside of the main bull-wheel 2, thence horizontally outward a short distance, and returns, as shown clearly in Fig. 3. In order to support and guide the apron to travel in the manner described, suitable roller-guides 54, 55, 56, and 57 are journaled to extend transversely in the frame, the roller 54, which is located at the lower end of the apron, serving as the driving-roller of the latter. Said driving-roller is shown in the present instance as provided at its rear end with a sprocket 58, which is driven by means of a link belt 59 from a second sprocket 60, mounted upon the end of a shaft 61, arranged to extend from rear to front of the main frame, and provided at its front end with a bevel-gear 62, arranged to intermesh with a corresponding gear 63, mounted upon the main shaft.

The traveling apron 53 is provided with cross-slats or engaging devices 64, and inasmuch as the lower part of said apron is arranged at a considerable inclination a guard-board 65 is provided, arranged to extend across the right-hand end of the platform adjacent to the lower end of said apron, as best indicated in Fig. 3. Said guard serves the purpose of holding the stalks from falling outwardly and downwardly, and to this end its inner side 66 is arranged to overhang the lower end of the apron and to extend as close to the upper surface of the latter as possible consistent with permitting the several cross-slats 64 to pass thereunder. At its upper end the apron travels horizontally a short distance and discharges over the edge of the apron-frame into a cradle now to be described.

Referring more particularly to Figs. 4 and 5, wherein said cradle is shown in detail, 67 designates as a whole a semicircular trough-like receptacle and made tapering throughout its length, that end of the cradle toward the front end of the machine which receives the butt-end of the stalks being considerably larger than the opposite end.

Means are provided for compressing the accumulation or bundle of stalks in the cradle, and to this end I provide a rock-shaft 68, which is arranged to extend longitudinally along the inner surface of the cradle at the bottom thereof, as best indicated in Figs. 4 and 5, said shaft being suitably journaled in bearings 69 and 70 at each end thereof and in intermediate bearings, as 71 and 72. 73, 74, and 75 designate arms or compressing-fingers rigidly mounted upon the rock-shaft 68 between each pair of bearings 71 and 72, the hub or encircling end portion of each of said fingers being formed concentric with the axis of said shaft 68 and provided with gear-teeth, so as to form, in effect, a gear-segment 76. The several fingers are curved to conform to the interior of the side of the cradle and normally rest in close engagement with the latter. With each finger 73, 74, and 75 is adapted to coöperate a corresponding finger or mate, as 73', 74', and 75', which latter fingers are severally journaled on suitable bearings 77, extending through the several pairs of journal-plates 71 and 72, each of these fingers being similarly provided with a gear-segment portion 78, arranged to intermesh with the segments 76, mounted upon the shaft. By reason of the described interconnections it will be obvious that when the rock-shaft is oscillated the fingers will be positively drawn together, so as to embrace the inclosed bundle of stalks. In order to thus operate said fingers, said rock-shaft 68 is provided at one end with a crank 79, which may conveniently be made detachable. Describing now the supports upon which said cradle is mounted and whereby the latter is made capable of bodily movement outwardly or in a direction laterally relatively to the direction of movement of the machine and referring more particularly to Figs. 3, 6, 7, and 8, 80 designates a supporting-bar mounted to extend through the hollow journal 81 of the main bull-wheel 2 of the machine and capable of reciprocating endwise therethrough. Upon its inner end said supporting-shaft is provided with a rigid cross-head 82, carrying at its opposite ends antifriction devices 83, which are engaged with ways or guides 84, suitably mounted upon the main frame to extend horizontally or parallel with the axis of the main wheel. In the preferred embodiment shown herein said ways 84 are conveniently formed of channel-irons arranged with their channels facing each other, and the antifriction devices 83 take the form of rollers of a suitable diameter to fit snugly between the side flanges of the channel-bars. At its opposite or outer end the supporting-bar 80 is provided with a semicircular yoke 85, rigidly mounted thereon, and provided in each of the yoke-arms with journal-bearings 86 87, adapted to receive the trunnion-like journals 88 of a circular tilting plate 89.

Upon the tilting plate 89 is rotatably mounted a turn-table 90, said turn-table being conveniently provided with a peripheral flange 91 at its lower side, (see Fig. 6,) which engages a suitable annular way 92, formed upon the tilting plate 89, by means of a circular angle-iron 93, suitably bolted thereto, the construction being such that while the turn-table is free to rotate and the tilting table may be oscillated upon its trunnions said parts are nevertheless reliably united.

The cradle 67 is rigidly bolted to the top side of the turn-table 90, as shown clearly in said Fig. 6, and means are provided for locking the cradle-supports rigid to hold the cradle in a horizontal position beneath the end of the apron, but operating to release the tilting table, so as to permit it to rock when the cradle has been rotated to a position at right angles to its normal position, as follows: At its upper side the turn-table is provided with a peripheral flange portion 94, which is of a circumferential width somewhat less than ninety degrees and is arranged to engage a groove or way 95, formed in the proximate face of the yoke 85 when the cradle is in its normal position or parallel with the direction of movement of the machine. The groove or way 95 is of a length approximately equal to the circumferential width of the engaging flange 94; but the opposite arm of the yoke is so formed as to permit the flange of the turn-table to oscillate past it freely when the tilting plate is oscillated upon its trunnions and the cradle is turned at right angles to its normal position. In this connection it is to be observed that the construction is such that the forward end of the cradle, which holds the butt-ends of the stalks, must be swung outwardly to bring the structure in a position to permit the tilting of the cradle, movement in the opposite direction being prevented by engagement of the flange of the turn-table with the trunnion-bearings.

In order to form an end closure or guard, which prevents the butt-ends of the stalks from sliding forwardly beyond the end of the cradle during the time the latter is receiving and accumulating a bundle, I provide a swinging guard or gate (designated as a whole 96) conveniently hinged to the upright frame member 97 of the main frame, so as to swing in a horizontal plane toward and from the end of the cradle when the latter is in a receiving position, the end of said guard being arranged to lie against the forward end of the cradle when the cradle is in its normal position. This guard is also conveniently made the means for holding the cradle against bodily outward movement, and to this end a suitable hook or fastening 98 is provided upon the end of the guard, adapted for engagement with a suitable staple or loop 99 upon the cradle. The hook 98 obviously serves to not only hold the guard in proper relation to the cradle, but likewise serves to hold the cradle from movement outwardly. Movement of the cradle inwardly beyond a proper position to register with the end of the apron is prevented by the engagement of the cross-head 82 with the ends of the channels within which it reciprocates. Desirably also a series of depending fingers or floating guard (designated as a whole 100) is mounted upon the upper and outer end of the apron-support, as clearly indicated in Fig. 3, which floating guard serves to direct the stalks properly into the cradle and prevents them from accidentally falling beyond the same.

The pairs of compressing-fingers 73 73' are employed for holding the shock or bundle of stalks compressed during the time the operator is binding the upper end of the shock, so that it will remain intact after being erected. In order, therefore, that the compressing-fingers may be held in compressed engagement with the stalks, the rock-shaft 68 is provided with a ratchet 101, in the present instance located adjacent to the crank-engaged end thereof, and a holding-pawl 102 is mounted upon the cradle in position to coöperate with said ratchet, as best indicated in Fig. 4.

In order to arrange the butt-ends of the stalks in regular and even position, so that the accumulation of stalks discharged into the cradle will form a shock having the butt-ends all proximately even with each other, I employ a butter or mechanism for acting upon the butt-ends of the stalks during their travel over the apron. In the preferred embodiment shown herein I make one portion of the guard-board which extends along the front edge of the apron movable, as indicated at 103, said movable section being hinged at its lower end to the immovable portion upon an axis perpendicular to the apron, as indicated at 104. Upon the movable section is mounted an arm 105, which is extended outwardly and then downwardly, so as to bring its lower end opposite the space between the upper and lower laps of the apron, as indicated clearly in Fig. 3. To the lower end of said arm 105 is connected a pitman 106, (best indicated in dotted lines in Fig. 1,) the opposite end of which is connected with one arm of a bell-crank 107, pivotally mounted at its angle, as indicated at 108, to a suitable transverse frame member 109. (Indicated in dotted lines in Fig. 3.) The opposite arm 110 of the bell-crank projects outwardly beyond the rear edge of the apron, and with this arm is connected a second pitman 111, the opposite end of which is operatively connected with a wrist 112 upon the sprocket 60 of the drive-shaft 61. By means of the foregoing construction it will be obvious that the movable section 103 of the guard-board will be vibrated back and forth upon its pivot 104 during the operation of the machine, and inasmuch as the lower edge of the movable section is arranged approximately coincident with the upper surface of the traveling apron said butter will sweep inwardly across the apron, forcing back endwise those stalks which are within its path. The rate of vibration of the butter is such that each stalk will be moved back successively a short distance upon each vibration of the butter, so that the layer or swath of stalks as it passes beyond the upper end of the butter will be made uniform and straight.

The operation of the machine constructed and arranged as described is probably entirely obvious from the foregoing description, but may be described as follows: In operation the machine is drawn along by the team, following the row of corn in such manner that the gathering-fingers straddle the row and direct the stalks rearwardly to the cutter or sickle. As the stalks pass rearwardly between the gathering-fingers they are engaged and forced along positively by the prongs of the conveyers, and those stalks which happen to be leaning forwardly or laterally are straightened up by the upper pair of conveyer-belts at the same time that they are carried through the throat. The stalks as they reach the sickle are severed and shortly thereafter pass into control of the rearwardly and downwardly inclined pair of conveyers 41 and 42, which, by reason of their more rapid rate of travel and direction of travel, tilt the stalks over rearwardly, so that they fall against the lower end of the apron. The guard-board 65 also aids in depositing the stalks properly upon the apron in position to be carried upwardly by the latter. The stalks dropping upon the apron are engaged by the slats or projections of the apron and carried upwardly and discharged from the upper end of the apron into the cradle, which occupies its normal position during the time the machine is in operation. When the accumulation of stalks is sufficient to form a shock of the desired size, the operator stops the machine, dismounts from the driver's seat, compresses the bundle of stalks in the cradle by rotating the rock-shaft, through the medium of the crank-handle 79, and binds the upper end of the shock in any usual manner, whereupon the bundle or shock is ready to be discharged. The operator now unlatches the end guard 96, swings it out of the way, and draws out the cradle laterally on its sliding support far enough to permit it to be turned to a position at right angles to its normal position, swinging the forward end of the cradle outwardly in so doing. Having drawn the cradle outwardly and rotated it to a position at right angles to the machine, the cradle is free to be tilted up, so as to permit the shock to slide out the cradle butt-end first until it strikes the ground, whereupon the operator by a very slight effort moves the upper end of the shock onto a perpendicular position and withdraws the cradle, leaving the shock standing in an upright position and set over away from the machine far enough to permit the adjacent side of the machine to pass without interfering with the standing shocks upon the next round. In withdrawing the cradle after discharging the shock the operator simply returns the cradle to its normal position in alinement with the end of the apron, rotating it into this position at the same time that he shoves it inwardly bodily upon its sliding supports. The rotation of the cradle into its normal position interlocks the flange of the turn-table with the groove or way upon the yoke in the manner hereinbefore fully described. The cradle having been returned to its normal position the guard is swung back against the end of the same and the fastening engaged, thus placing the machine in readiness to drive on and accumulate a succeeding shock.

While I have herein described and illustrated what I deem to be a preferred embodiment of my invention, yet it will be understood that the details thereof may be modified without departing from the spirit of the invention, and I do not therefore limit myself to these details of construction except to the extent that they are made the subject of specific claims.

I claim as my invention—

1. In a corn-harvester, the combination with the cutting mechanism and conveyer mechanism arranged to deliver at the side of the machine remote from the cutting mechanism, of a bundle-receptacle, a laterally-shiftable frame upon which said receptacle is mounted, interfitting and interlocking swiveling connections between said receptacle and frame, the axis of rotation of which connections is normally vertical and whereby the bundle-receptacle is confined and supported to rotate in a definite plane relatively to the supporting-frame, and operatively-inseparable hinge connections between the receptacle and supporting-frame, the axis of which hinge connection is substantially horizontal, whereby said receptacle is confined and supported to tilt in a definite vertical plane, for the purpose set forth.

2. In a corn-harvester, the combination with the cutting mechanism, and conveyer mechanism arranged to deliver at the side of the machine remote from the cutting mechanism, of a bundle-receptacle, a laterally-shiftable frame upon which said receptacle is mounted, turn-table connections between said receptacle and frame comprising a rotatable member rigidly united with the receptacle, and a relatively fixed turn-table member, the axis of rotation of which turn-table is normally vertical, interfitting parts upon said turn-table members whereby the rotatable member and parts connected therewith are positively connected and confined to rotate in a definite plane relatively to the fixed member of the turn-table, and hinge connections between the relatively fixed turn-table member and said shiftable frame, the axis of said hinge being substantially horizontal, whereby the bundle-receptacle is tiltable and confined to move in a definite plane at right angles to the axis of the turn-table.

3. In a corn-harvester, the combination with the cutting mechanism thereof, of gathering-fingers, traveling conveyers thereon operating to direct the cornstalks to the cutting mechanism, extension-conveyers operating to deliver the corn to a traveling apron transversely thereof, a traveling apron arranged to elevate the corn and convey it transversely of the machine, a cradle adapted to receive the stalks from the apron, a sliding frame upon which said cradle is mounted arranged to reciprocate upon one or more ways upon the main frame in a direction horizontally and substantially at right angles to the direction of functional movement of the machine, and means operatively connecting said cradle with said sliding frame comprising a turn-table mechanism, the axis of rotation of which is normally vertical, pivot connections between the turn-table and the sliding frame upon which it is supported whereby the receptacle is capable of an endwise-tilting movement and means for temporarily holding the accumulated bundle within the receptacle until the latter has completely reached its discharge position.

4. In a corn-harvester, the combination with the cutting mechanism, the traveling conveyer-apron and a cradle-like receptacle to receive the stalks, of mechanism for movably supporting said stalk-receptacle comprising a sliding frame mounted to reciprocate upon the main frame of the machine, a yoke upon the outer end of said sliding frame, a tilting member provided with trunnions engaged with said yoke, and a turn-table mounted upon said tilting member and rigidly connected with the cradle.

5. In a corn-harvester, the combination with the cutting mechanism, the traveling conveyer-apron and a cradle-like receptacle to receive the stalks, of mechanism for movably supporting said stalk-receptacle comprising a sliding frame mounted to reciprocate upon the main frame of the machine, a yoke upon the outer end of said sliding frame, a tilting member provided with trunnions engaged with said yoke, and a turn-table mounted upon said tilting member and rigidly connected with the cradle, said turn-table being operatively engaged with the yoke member by means of tongue-and-grooved interconnections, said groove being mutilated at one point whereby the tilting member may pass out of engagement therewith, for the purpose set forth.

6. In a corn-harvester, the combination of a stalk-receptacle of trough-like form, a pair of coöperating compressing-fingers pivotally mounted adjacent to each other and near the central bottom portion of the receptacle and curved to conform substantially to the inner shape of the latter, means for forcibly approaching said fingers to compress the accumulated stalks therebetween, and releasable means for locking the fingers in compressed relation, for the purpose set forth.

7. In combination with a corn-harvester, and the cutting and conveyer mechanism thereof, a trough-like cradle adapted to receive the stalks from the conveyer, a rock-shaft arranged to extend longitudinally of the cradle substantially central of the lower side thereof, one or more pairs of oppositely-disposed compressing-fingers operatively connected with said rock-shaft and curved to conform to the respective sides of the interior of the receptacle, means for positively operating said rock-shaft, and releasable means for locking the latter in position to hold the fingers in approached relation, substantially as described.

8. In combination with a corn-harvester, a bundle-cradle of trough-like form, a rock-shaft arranged to extend longitudinally along the lower side thereof, one or more compressing-fingers rigidly mounted upon said rock-shaft, corresponding gear-segments upon the rock-shaft and one or more coöperating compressing-fingers pivotally mounted adjacent to the rock-shaft and provided with gear-segments intermeshing with the gear-segments of the rock-shaft, means for operating the rock-shaft, and releasable means for locking the latter in position to hold the fingers in approached relation, for the purpose set forth.

9. In a corn-harvester, the combination with the main frame, of a cutting mechanism arranged at one side thereof, and a main supporting or bull wheel located at the side of the machine remote from said mechanism, a hollow axle for said wheel a traveling apron arranged to receive the stalks from the cutting mechanism, and convey the same upwardly and laterally above and beyond said bull-wheel, a cradle adapted to receive the stalks from the discharge end of said apron, a sliding support mounted to extend through the hollow axle of the bull-wheel, and provided upon its inner end with a cross-head, parallel ways with which said cross-head is engaged a yoke upon the outer end of said sliding support, a tilting member provided with trunnions engaged with said yoke, a turn-table mounted upon said tilting member and rigid connections uniting said turn-table and cradle, as and for the purposes set forth.

10. In a corn-harvester, the combination with the main frame, of a cutting mechanism arranged at one side thereof, and a main supporting or bull wheel located at the side of the machine remote from said mechanism, a hollow axle for said wheel, a traveling apron arranged to receive the stalks from the cutting mechanism, and convey the same upwardly and laterally above and beyond said bull-wheel, a cradle adapted to receive the stalks from the discharge end of said apron, a sliding support mounted to extend through the hollow axle of the bull-wheel, and provided upon its inner end with a cross-head, parallel ways with which said cross-head is engaged, a yoke upon the outer end of said sliding support, a tilting member provided with trunnions engaged with said yoke, a turn-table mounted upon said tilting member, rigid connections uniting said turn-table and cradle, and a swinging guard mounted upon the main frame and adapted to close the forward end of the cradle when the latter is in receiving position.

11. In a corn-harvester, the combination with the main frame, of a cutting mechanism arranged at one side thereof, and a main supporting or bull wheel located at the side of the machine remote from said mechanism, a hollow axle for said wheel a traveling apron arranged to receive the stalks from the cutting mechanism, and convey the same upwardly and laterally above and beyond said bull-wheel, a cradle adapted to receive the stalks from the discharge end of said apron, a sliding support mounted to extend through the hollow axle of the bull-wheel, and provided upon its inner end with a cross-head, parallel ways with which said cross-head is engaged, a yoke upon the outer end of said sliding support, a tilting member provided with trunnions engaged with said yoke, a turn-table mounted upon said tilting member, rigid connections uniting said turn-table and cradle, a swinging guard mounted upon the main frame and adapted to close the forward end of the cradle when the latter is in receiving position, and interlocking mechanism adapted to connect the swinging guard and cradle to hold the latter in receiving position substantially as described.

12. In a corn-harvester, the combination with the main frame, of a cutting mechanism arranged at one side thereof, a main supporting-wheel located at one side of the machine, a traveling apron arranged to receive the stalks from the cutting mechanism and convey the same upwardly and above said main wheel, a stalk-receptacle to receive the stalks from the discharge end of said apron, and a sliding support for said receptacle having a guide member mounted to reciprocate through the axle portion of the main wheel.

13. In a corn-harvester, the combination with the main frame, of a cutting mechanism arranged at one side thereof, a main supporting-wheel located at one side of the machine, a traveling apron arranged to receive the stalks from the cutting mechanism and convey the same upwardly and above said main wheel, a stalk-receptacle to receive the stalks from the discharge end of said apron, and a sliding support for said receptacle having a guide member mounted to reciprocate through the axle portion of the main wheel, and means for holding said member extending through the main wheel against rotation while permitting it to reciprocate endwise.

14. In a corn-harvester, the combination with a traveling apron, and means for depositing cut cornstalks transversely thereon, of the butter-board having its face arranged substantially perpendicular to the conveying-surface of the apron, and pivotally mounted at one end to a fixed support upon an axis likewise perpendicular to the apron, that end of the butter which is pivoted being arranged toward the receiving end of the apron, an arm connected with the outer side of said butter-board, a link connected with said arm and extending below the apron, and transversely of the latter and operative connections for actuating said link to vibrate the butter as and for the purpose set forth.

GEORGE D. FOSTER.

Witnesses:
ALBERT H. GRAVES,
FREDERICK C. GOODWIN.